Nov. 4, 1924.
P. W. FLEISCHER
FOOD CONTAINER
Filed Oct. 18, 1923
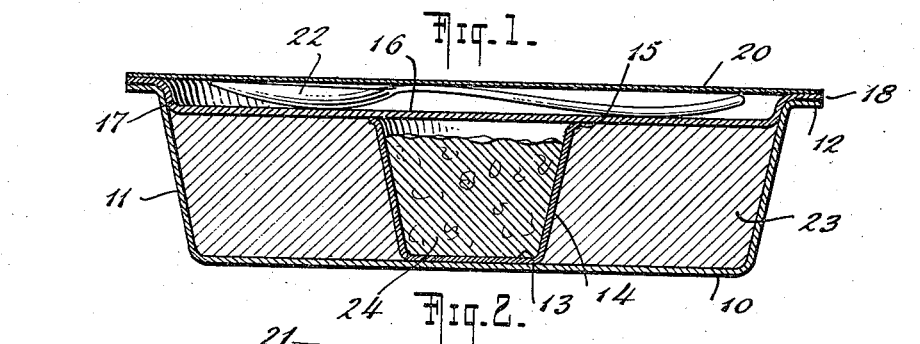
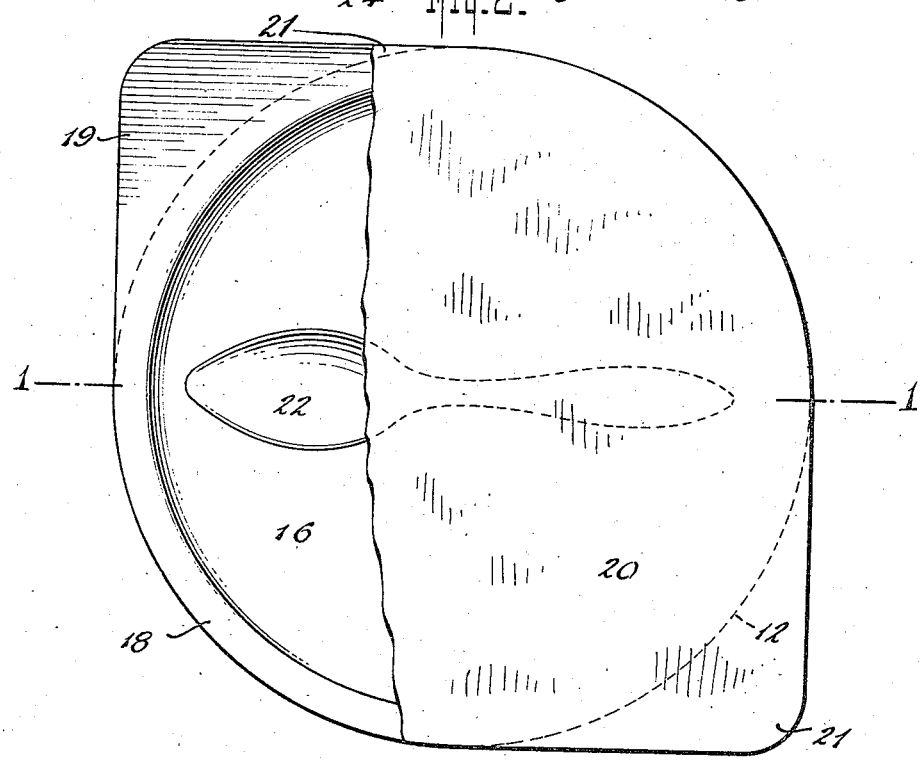
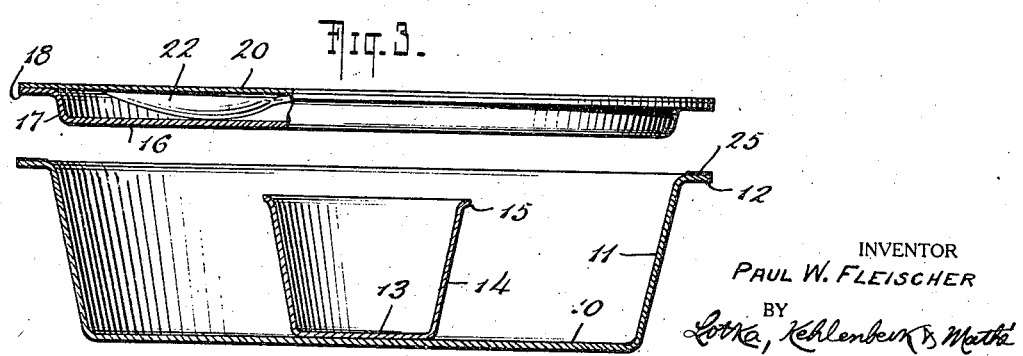
INVENTOR
PAUL W. FLEISCHER
BY
ATTORNEYS Patented Nov. 4, 1924.

1,514,379

UNITED STATES PATENT OFFICE.

PAUL W. FLEISCHER, OF WEEHAWKEN, NEW JERSEY.

FOOD CONTAINER.

Application filed October 18, 1923. Serial No. 669,260.

*To all whom it may concern:*

Be it known that I, PAUL W. FLEISCHER, a citizen of the United States, and resident of Weehawken, in the county of Hudson and State of New Jersey, have invented certain new and useful Improvements in Food Containers, of which the following is a specification.

My present invention relates to containers for preserving food in a sanitary condition, and in the particular preferred embodiment illustrated the improved container is designed for keeping within the same unit or package, separated yet ready for mixing, a portion of ice-cream or the like together with the proper amount of nuts, flavor, or other ingredient such as used for making so-called "sundaes"; besides, the construction illustrated includes a separate compartment in which a spoon or the like will be kept ready for use, and protected from dirt, brine, water, etc.

Reference is to be had to the accompanying drawing, in which Fig. 1 is a vertical section through said embodiment of my invention, taken on line 1—1 of Fig. 2; Fig. 2 is a top view, with parts broken away; and Fig. 3 is a vertical section of the container, without the filling of ice-cream and flavor, and showing the cover separated from the body of the container.

The device illustrated comprises three main portions, viz: first, a body or main container; second, an interior cup or holder; and third, a cover adapted to close both of the first-named parts, said cover itself forming a receptacle or holder for the spoon.

The body or main container is shown as made of pressed pulp, fibre, or other suitable material, with a bottom 10 of circular shape, an upwardly-flaring peripheral wall 11, and an outwardly-extending top flange 12. Within this body is adapted to be placed loosely the interior holder or cup comprising a flat bottom 13 adapted to engage the bottom 10, and an upwardly-flaring peripheral wall 14 spaced from the wall 11 of the body and preferably provided, at the top, with an outwardly-bent flange 15, such flange being at a level below that of the body flange 12. The cover has a bottom 16 adapted to fit within the body and to engage the upper edge of the cup or interior holder, as shown in Fig. 1. From the outer edge of the bottom 16, a peripheral wall 17 extends upwardly at an angle corresponding to that of the body portion 11, said wall 17 being of proper diameter to fit within such body portion 11. At its upper edge, the wall 17 has an outwardly-extending flange 18 corresponding to the flange 12, and said flange 18 is provided with one or more outward extensions or flaps 19. A closing member 20 of waterproof paper or other suitable material is glued or otherwise secured to the flange 18, and said member has flaps 21 extending over the flaps 19 and secured thereto. The cover thus has a chamber or compartment in which a spoon 22 may be placed before the closing member is put on, the spoon being thus well protected until the purchaser desires to use it.

The container is used as follows: The cup or interior holder is placed within the body, about centrally, as shown in Fig. 3; a filling of ice-cream, 23, is then packed in the annular space around the said interior holder, while the latter is filled with nuts, flavor, or other ingredients, as indicated at 24; and finally the cover is put on, and the flange 18 secured tightly to the flange 12, as by placing paraffin, wax, or other suitable material 25 between said flanges and exerting pressure to force one flange toward the other. As the bottom 16 of the cover snugly engages the upper edge of the interior holder 14, it will be seen that the cover forms a closure for the holder and prevents the contents of the holder from passing over and mixing with the ice cream contained in the main container.

The container having thus been filled, and closed water-tight, is placed in any usual or approved refrigerating substance (generally ice and salt), so as to be kept in proper condition until it is to be handed to the purchaser. The spoon 22 and the fillings 23 and 24 are protected from contact with the refrigerating substance and with any other matter with which the container may come in contact.

The purchaser takes hold of one of the projections formed by superposed flaps 19 and 21, and by pulling it upwardly separates the cover from the body of the container. It will be noted that since the cover bottom 16 engages the top of the interior holder when the container is in the closed condition (Fig. 1), there is no danger of the two fillings 23 and 24 becoming mixed during transportation. The cover having been removed as described, the purchaser can mix the two fillings 23 and 24 as desired, and by tearing off the closing member 20, the purchaser will be able to take out the spoon 22 in a clean and sanitary condition.

Various modifications may be made without departing from the nature of my invention as set forth in the appended claims. More particularly, it will be understood that the various parts may be made of any suitable material, and each of them may be made either of a single piece or of several pieces, and their shape may be varied from the one illustrated.

I claim as my invention:

1. A container of the character described, comprising a body, an inner holder adapted to be set within said body in such a manner as to leave within such body, around the holder, a space for the reception of ice-cream or the like, said inner holder having its upper edge below that of the body, and a hollow cover, adapted to contain a spoon, and having a bottom fitted within the body and engaging the upper end of the inner holder.

2. A container of the character described, comprising a body, an inner holder adapted to be set within said body in such a manner as to leave within such body, entirely around the holder, a space for the reception of ice-cream or the like, said inner holder having its upper edge below that of the body, and a cover fitted within the upper portion of said body and snugly engaging the upper end of said inner holder to prevent the passage of the contents of said holder from the holder to said body.

3. A container of the character described, comprising a body forming a main container having a bottom, an upwardly flaring peripheral wall, and an outwardly-extending top flange, an inner holder adapted to be set within said body on the bottom thereof, and a cover extending within said body and snugly engaging the upper edge of said inner holder, said cover having a downwardly-tapering portion fitted within the upper portion of the said peripheral body wall, and an outwardly-extending flange fitted on the top flange of the body; and means to secure the outwardly extending flange of said cover to the top flange of said body and to form therebetween a substantially air tight seal.

In testimony whereof I have signed this specification.

PAUL W. FLEISCHER.